July 27, 1965

W. RAINEY ETAL 3,196,715

REMOTE CONTROL SYSTEM

Filed Jan. 17, 1962

INVENTORS
WALTON RAINEY
MARTIN FRIEDLAND
LUCIUS EARL THOMAS
BY
ATTORNEYS

July 27, 1965

W. RAINEY ETAL 3,196,715

REMOTE CONTROL SYSTEM

Filed Jan. 17, 1962

INVENTORS
WALTON RAINEY
MARTIN FRIEDLAND
LUCIUS EARL THOMAS
BY
ATTORNEYS

July 27, 1965

W. RAINEY ETAL 3,196,715

REMOTE CONTROL SYSTEM

Filed Jan. 17, 1962

INVENTORS
WALTON RAINEY
MARTIN FRIEDLAND
LUCIUS EARL THOMAS
BY
ATTORNEYS

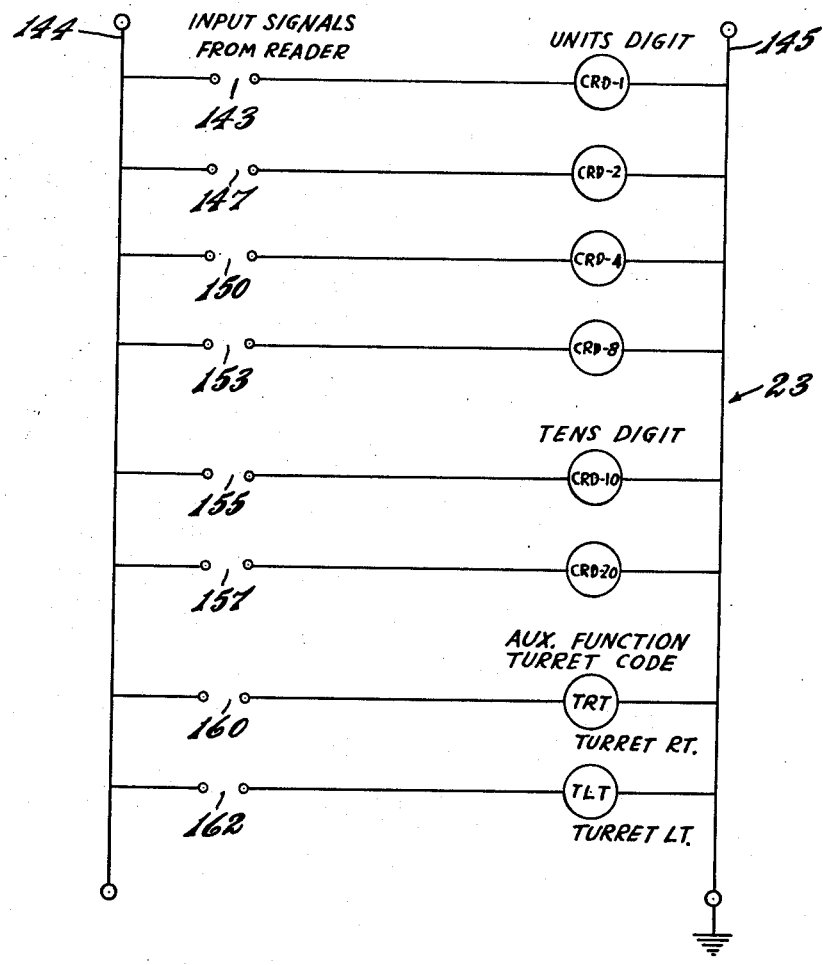
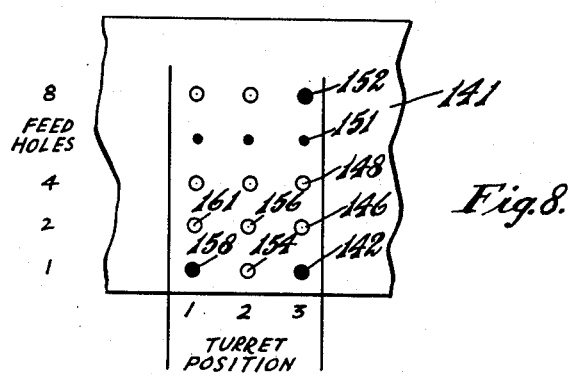
Fig. 7.
Fig. 8.
INVENTORS
WALTON RAINEY
MARTIN FRIEDLAND
LUCIUS EARL THOMAS
BY
ATTORNEYS

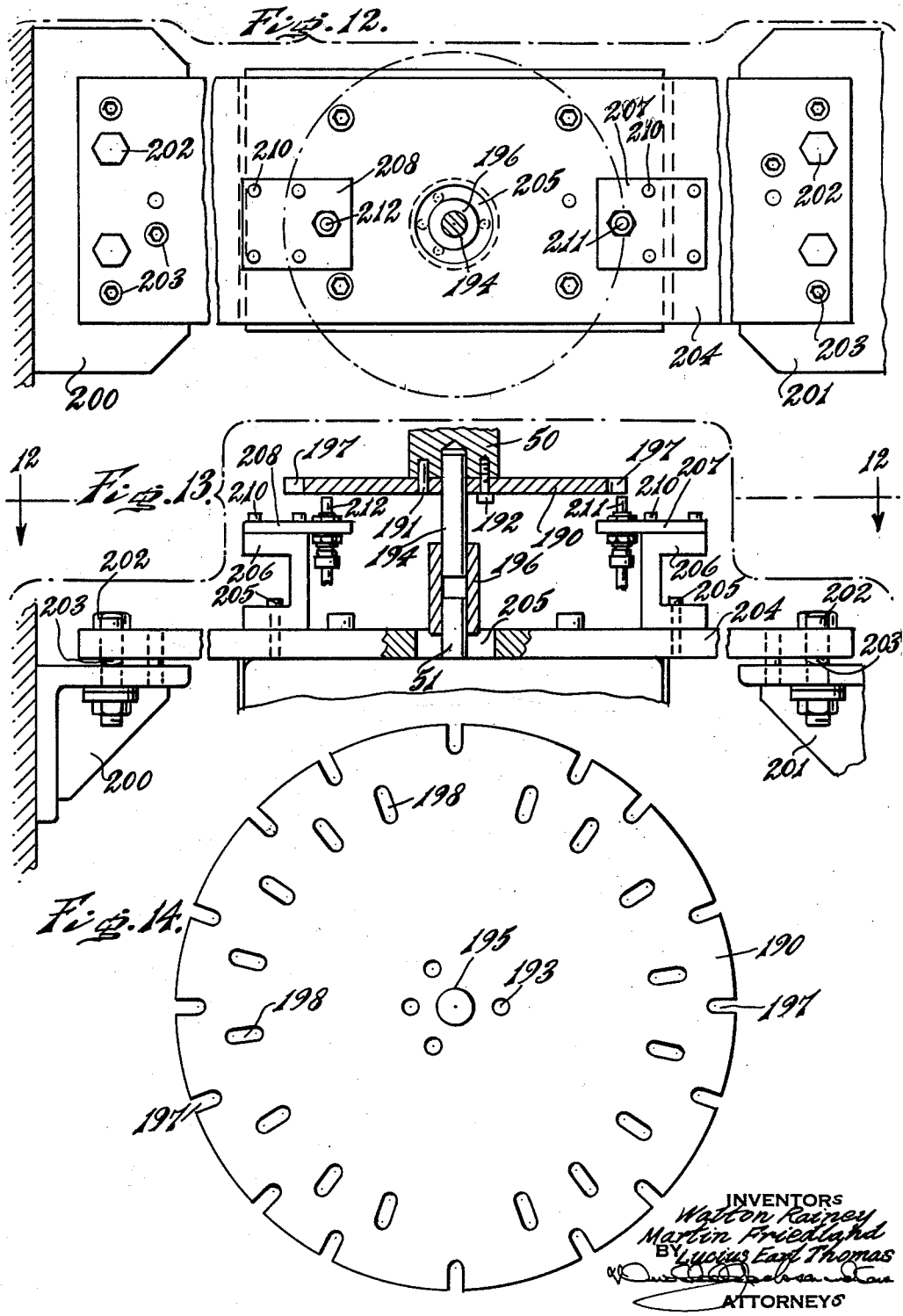

July 27, 1965  W. RAINEY ETAL  3,196,715
REMOTE CONTROL SYSTEM
Filed Jan. 17, 1962  13 Sheets-Sheet 11

INVENTORS
Walton Rainey
Martin Friedland
Lucius Earl Thomas
BY Wm. Steell Jackson and Sons
ATTORNEYS

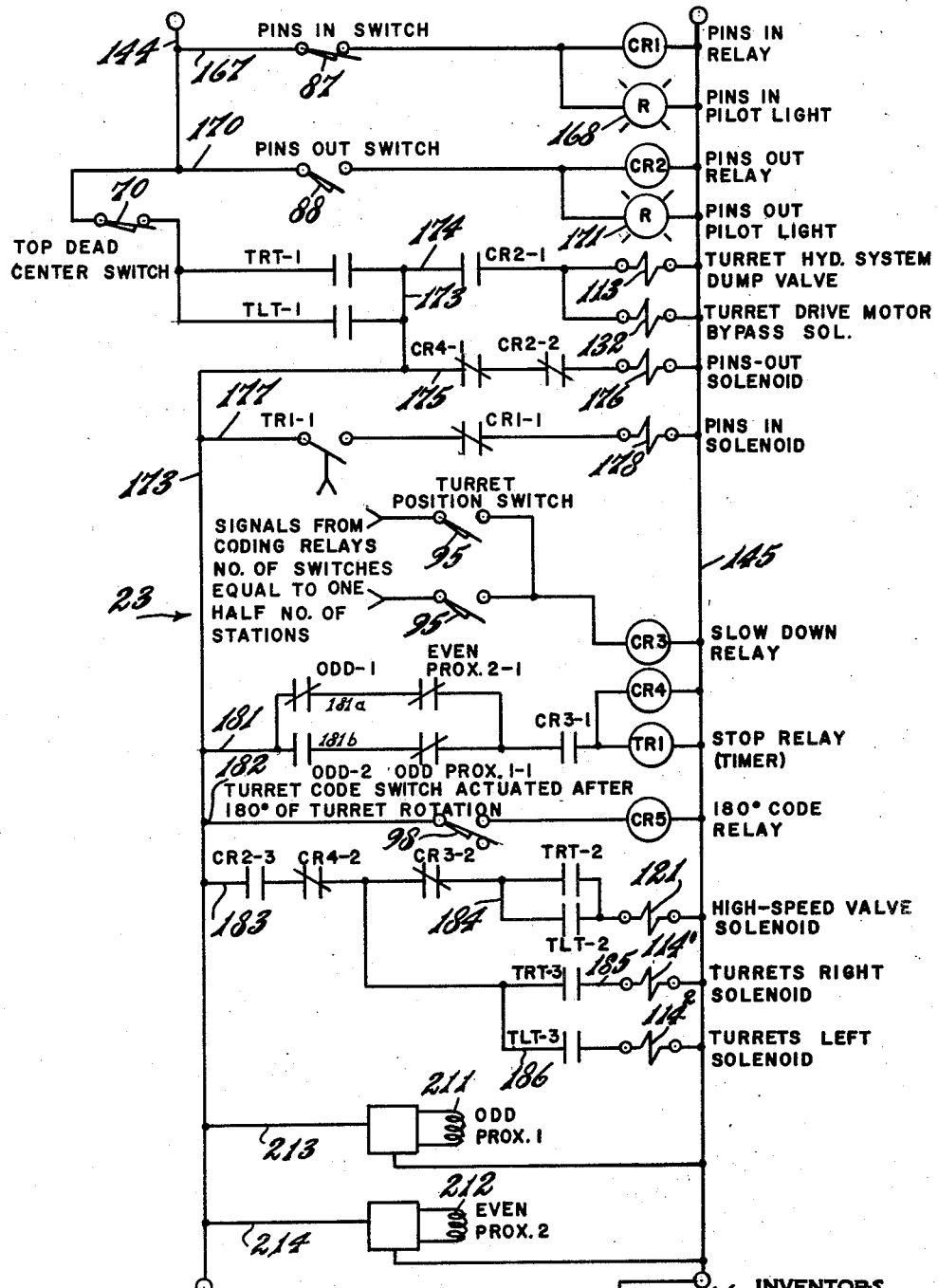

United States Patent Office 3,196,715
Patented July 27, 1965

3,196,715
REMOTE CONTROL SYSTEM
Walton Rainey, Ardmore, Martin Friedland, Flourtown, and Lucius E. Thomas, Norristown, Pa., assignors, by mesne assignments, to The Warner & Swasey Company, Cleveland, Ohio, a corporation of Ohio
Filed Jan. 17, 1962, Ser. No. 166,962
27 Claims. (Cl. 74—821)

The present invention relates to remote control systems, and particularly to remote control systems for turrets such as turret punch presses, turret drill presses, and turret machines generally.

The present application is a continuation-in-part of our copending application Serial Number 135,241 filed August 31, 1961, for Remote Control System, now abandoned.

A purpose of the invention is to position a turret by a hydraulic system under control of a simplified electrical remote control device.

A further purpose is to reduce the number of electronic components required for a turret remote control system.

A further purpose is to reduce the complexity of turret remote control systems and of the components required therefor.

A further purpose is to increase the reliability and reduce the cost of maintenance and operation of a turret remote control system.

A further purpose is to eliminate the necessity for high precision components such as servo mechanisms and selsyn devices in turret remote control systems.

A further purpose is to eliminate the requirement for high performance precision feedback elements in turret remote control systems.

A further purpose is to eliminate system stiffness required with feedback systems as a critical element in a turret remote control system.

A further purpose is to obtain the data for operation of a turret remote control system from a tape or similar input of simplified character.

A further purpose is to prevent damage in turret remote control systems from oscillations which may occur in closed loop feedback systems.

A further purpose is to reduce the sensitivity of turret remote control systems to the presence of dirt or other foreign matter in hydraulic components such as servo valves.

A further purpose is to obtain the flexibility in a turret remote control system which is inherent in the use of cams.

A further purpose is to eliminate the restrictions on size, weight and tool spacing in a turret device.

A further purpose is to permit a turret remote control system to control more than one turret machine.

A further purpose is to make a turret remote control system fail safe if there is a loss either in the electrical signal or a failure in one of the hydraulic components.

A further purpose is to provide relief valves which control the deceleration of a turret rather than using a closed loop feedback.

A further purpose is to operate a turret remote control system with lower power requirement by lowering the operating pressure and by lowering the pressure drop across the control valve.

A further purpose is to permit effective operation hydraulically at two different speeds.

A further purpose is to employ a remote control system which has wide applicability to different tools, as for example punching, drilling, boring, grinding, extrusion, assembling and other multiple head machines.

A further purpose is to provide a remote control system which will be applicable to indexing devices, and ruling, measuring and positioning equipment.

A further purpose is to obtain more precise discrimination as to the point of stopping on small angles.

A further purpose is to acuate a proximity stopping device when the turret approaches the point of stopping and to accomplish stopping by the relation of a proximity actuator and a proximity control device responsive to the proximity actuator.

A further purpose is to eliminate programming error by permitting reprogramming of the same station any desired number of times without turret malfunctions and permitting programming the next station in either desired direction without the possibility of an error which would bring the turret to the wrong station.

Further purposes appear in the specification and in the claims.

In the drawings, we have chosen to illustrate a few only of the numerous embodiments in which our invention may appear, selecting the forms shown from the standpoints of convenience in illustration, satisfactory operation and clear demonstration of the principles involved.

FIGURE 7 is a schematic electric circuit diagram of a tape reader according to the invention.

FIGURE 8 is a plan view of a control tape employed in the device of the invention, illustrated diagrammatically.

FIGURE 12 is a fragmentary plan section showing a variation in the means for stopping the turret, the section being taken on the line 12—12 of FIGURE 13.

FIGURE 13 is a side elevation of the stopping mechanism of FIGURE 12, shown in fragmentary form and partly in axial section.

FIGURE 14 is a detail plan view of the proximity actuator shown in FIGURE 13, illustrated to enlarged scale.

FIGURE 16 is a circuit diagram similar to FIGURE 11, adapted to be used with the stopping device of FIGURES 1 to 15 inclusive.

Figure 1:
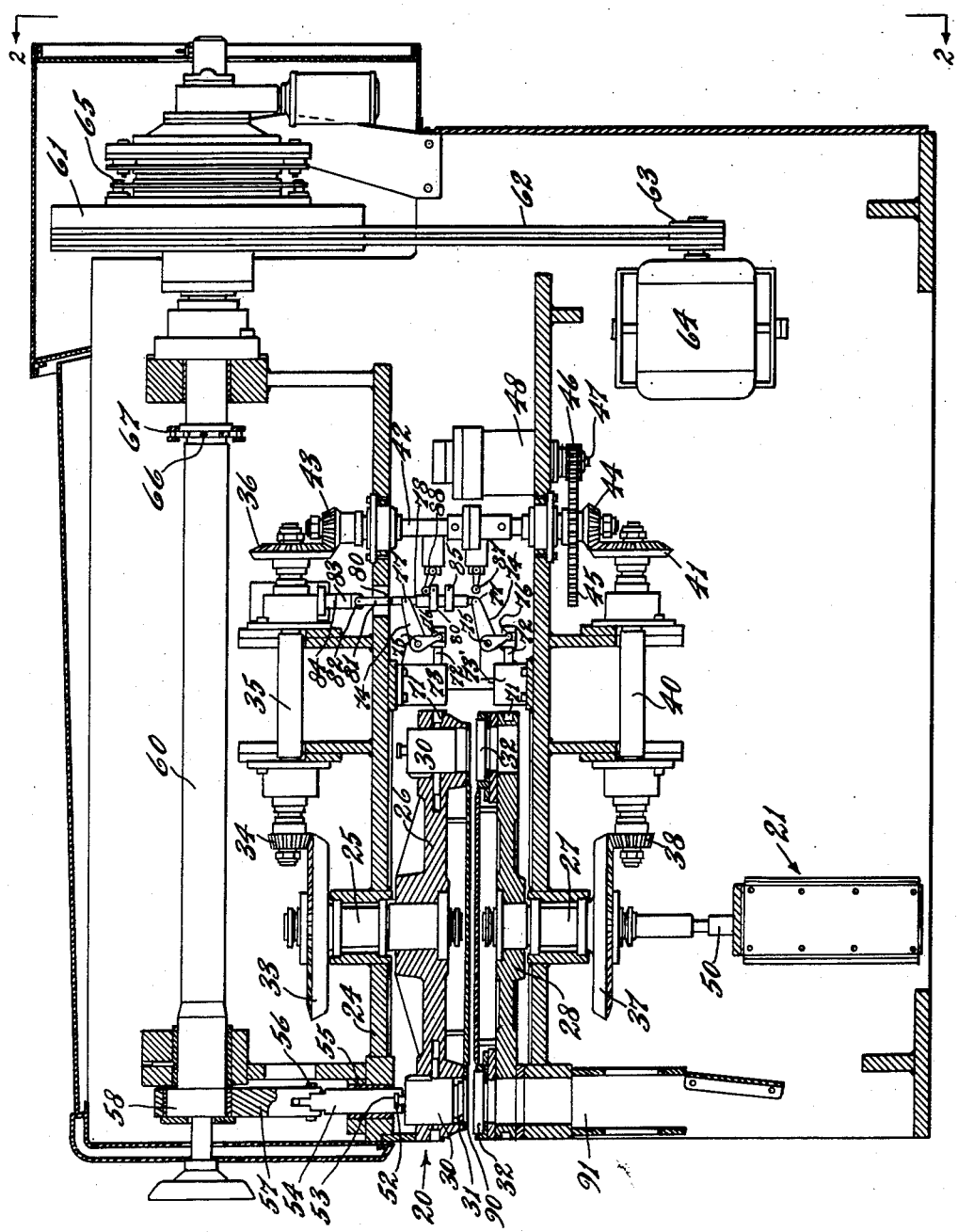
FIGURE 1 is a diagrammatic central vertical section of a turret punch press embodying the principles of the invention, the section being taken on the line 1—1 of FIGURE 2.

Describing in illustration but not in limitation and referring to the drawings:

In the prior art, turrets have been extensively used to position tools or other mechanism, particularly for selection of one tool or device from a group, or for operation at a succession of steps or stages. Examples of this appear in turret punch presses, turret drill presses, turret boring mills, turret grinding machines, turret extrusion devices, turret assembling mechanisms, and the like. In such prior art devices, there is a problem of advancing the turret, often in either direction, and often to a particular selected angular position, and indexing the turret so that it is precisely oriented in its new position.

Remote control systems adapted for turret punch presses in the past have been objectionable because of high cost, both in initial production and in maintenance and operation, great complexity, and vulnerability to damage from a number of different causes. For example, in such prior art devices precise components have been required and such components have been subject to failure, system stiffness has been a critical factor, high performance has been required by feedback elements, oscillations in the system have caused damage, and the prior art devices have been rendered inoperative by the presence of dirt and foreign matter.

These difficulties have been experienced for example by prior art selsyn and prior art servo mechanisms generally.

The present invention is designed to provide a remote control system adapted for operation with any one of a variety of turret mechanisms as indicated above, which will to a considerable extent overcome these difficulties.

First cost is reduced. This is accomplished partly by eliminating high precision components such as servo mechanisms and high performance feedback circuits. The complexity of the components is in general greatly reduced and the number of electronic components is decreased.

At the same time, the reliability of performance is increased and the cost of maintenance is reduced not only because maintenance is less frequently required, but also because it can be performed by persons of ordinary skill in electrical and hydraulic matters, without requiring expert attention.

Sensitivity to damage or inaccuracy due to lack of stiffness, oscillation, or the presence of dirt or foreign matter is eliminated.

Restrictions which were formerly placed on the design of the turret mechanism itself are eliminated, and a wider variety of sizes, weights and tool spacings on the turret are made possible.

Whereas the former turret remote control systems lent themselves particularly for use on a single turret machine, the device of the invention can control a group or gang of machines as desired.

There is no danger that damage may be done to the equipment through electrical or hydraulic failure, since the equipment fails safe both electrically and hydraulically.

A very simple form of deceleration control by hydraulic relief is accomplished, without the need for closed loop feedback systems.

The power requirements of the remote control system of the invention are reduced and the pressure drop is lowered.

The device of the invention operates effectively at a plurality of different speeds, and can travel part of the distance to the new position at one speed and then the remainder of the distance at another speed.

Where the stations around the turret are so numerous that one station is spaced from the other by a small angle, it is desirable to have more precise discrimination between stations than would otherwise be necessary. For this purpose we provide a proximity stopping device which not only gives more precise discrimination, but also permits the same station to be reprogrammed any given number of times without turret malfunction and permits approaching a particular station in either direction without danger of an error which would bring the turret to the wrong station.

Figure 2:
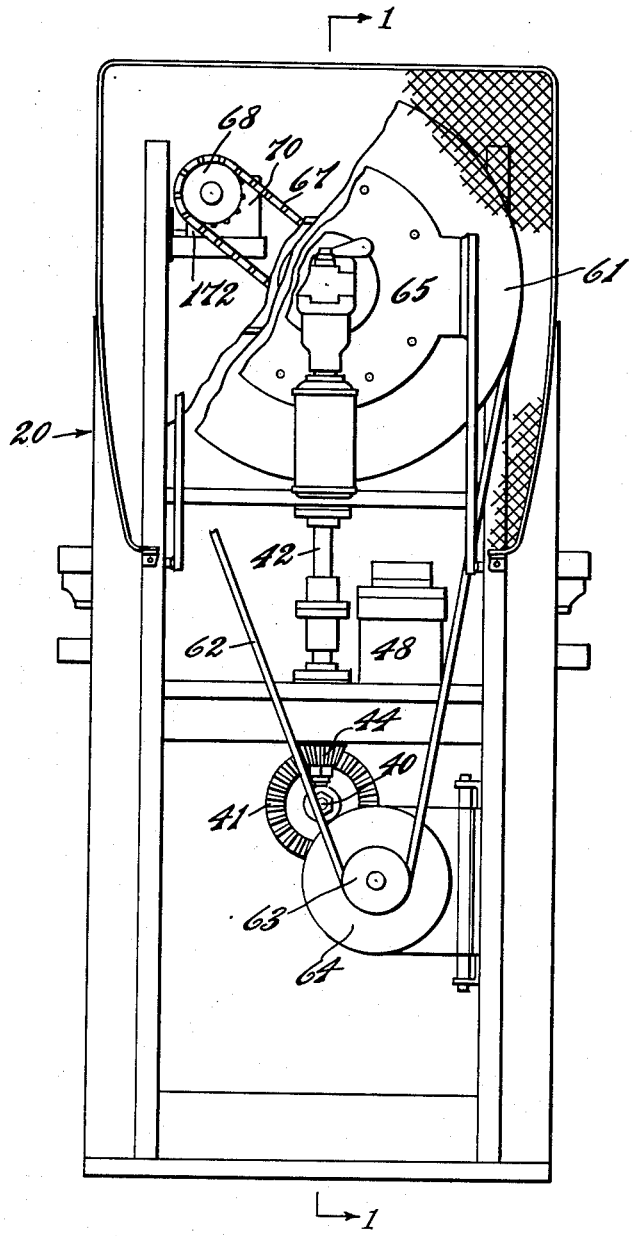
FIGURE 2 is an end elevation of the device of the invention taken on the line 2—2 of FIGURE 1, with the flywheel, clutch and cover of the press partially broken away.
Figure 6:
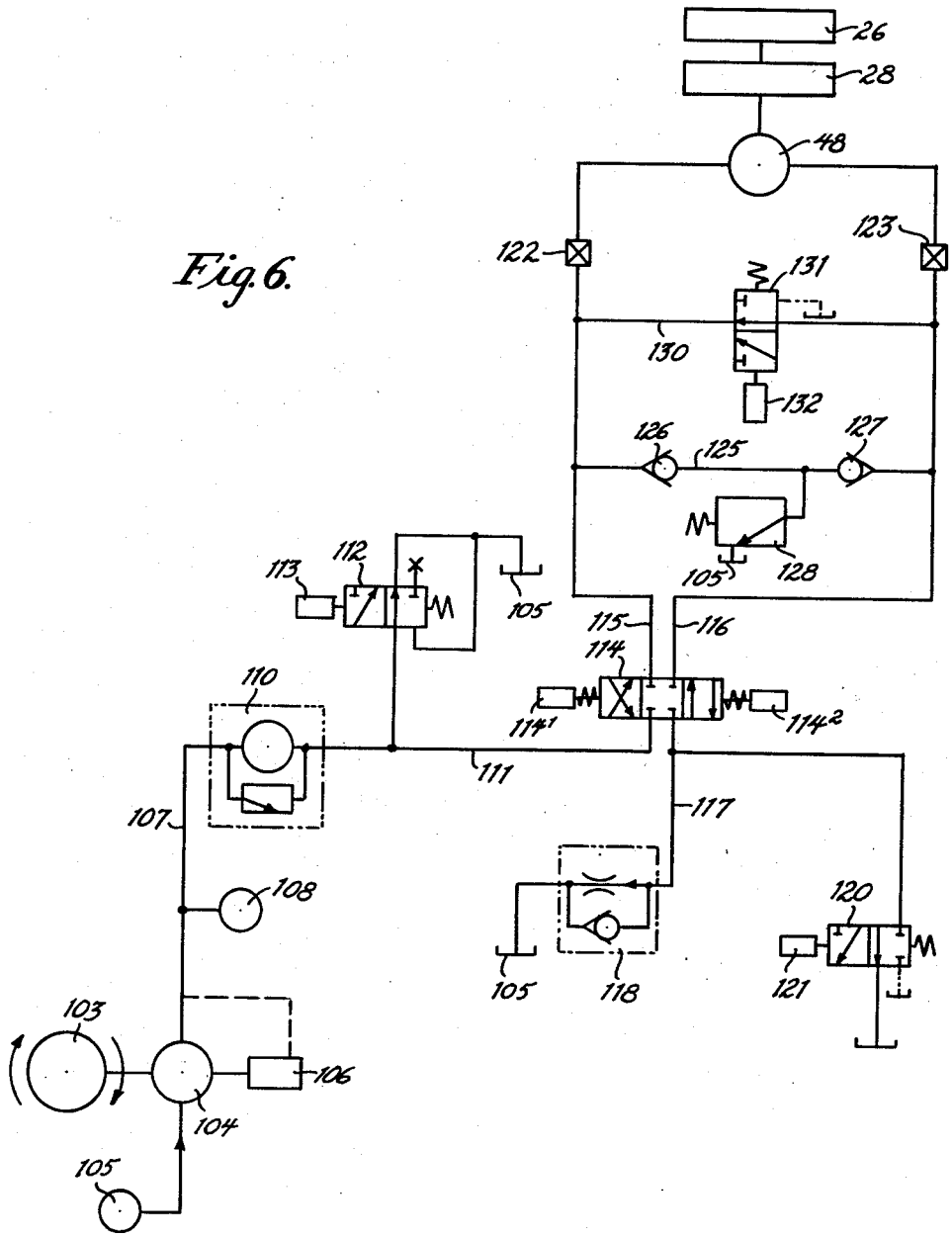
FIGURE 6 is a schematic diagram of the hydraulic system according to the invention.

The main assemblies of the device of the present invention as present in one embodiment are the turret punch press 20, best seen in FIGURES 1 and 2, the rotary cam limit switch controller 21, best seen in FIGURES 1, 3, 4 and 5, the hydraulic system 22 which appears particularly in FIGURE 6, and the electrical system 23 which appears in FIGURES 7 to 11 inclusive and includes a tape input.

While the device specifically shown is a turret punch press, it will be evident of course that similar principles may be applied to other turret devices as already explained.

Considering particularly FIGURES 1 and 2, we there illustrate a frame 24 which journals a punch turret shaft 25 having thereon a punch turret 26. Coaxial with the punch turret shaft 25, and below it, is a die turret shaft 27 journalled in the frame and mounting a die turret 28.

The punch turret at a plurality of circumferentially spaced positions mounts a series of punch holders 30 in which are secured in operative relationship punches 31. It will be evident that the punches will be of individual character as to dimensions, shape or otherwise as desired. At corresponding positions on the die turret are die holders 32 which mount suitable dies which cooperate with the punches and will therefore be of proper dimensions and shape. It is important of course that the same punch operate with the same die and therefore that the punch and die turrets be manipulated in unison.

The punch turret shaft 25 has keyed thereon a bevel gear 33 which meshes with a bevel pinion 34 which is keyed on shaft 35 and journalled in the frame, which shaft has keyed thereon at the opposite end a bevel gear 36. The die turret shaft 27 has keyed thereon a bevel gear 37 which is suitably identical with the gear 33, and this meshes with bevel pinion 38 suitably identical with bevel pinion 34 which is keyed on shaft 40 journalled in the frame and having at the opposite end keyed thereon bevel gear 41 which is suitably identical with bevel gear 36. Interconnection between shafts 35 and 40 so that the punch and die turrets move in unison is accomplished by back shaft 42 journalled on the frame and having keyed thereon at the upper end bevel pinion 43 meshing with bevel gear 36 and also having keyed thereon at the bottom, bevel pinion 44 which meshes with bevel gear 41 and is suitably identical with bevel pinion 43.

It will be evident that back shaft 42 is parallel to shafts 25 and 27, and that shafts 35 and 40 are parallel to one another and at right angles to shafts 25, 27, and 42.

Also keyed on back shaft 42 is spur gear 45 which meshes with spur pinion 46 on shaft 47 of hydraulic drive motor 48.

In order to indicate the angular position of the turrets, die turret shaft 27 has coupled to it in prolongation thereof by coupling 50 shaft 51 (FIGURE 3) which extends through the rotary cam limit switch controller 21 as later described.

When a particular punch is in the operating position at the extreme left of FIGURE 1, its T-connector head 52, as well known in the art, is received in T-slot 53 of ram 54 guided in ram guides 55 in the frame. The ram is pivotedly connected at 56 to crank assembly 57 which journals on eccentric 58 of eccentric shaft 60 which journals in the frame. The eccentric shaft has at its opposite end flywheel pulley 61 which connects by belts 62 with pulley 63 on driving motor 64. Operatively mounted with respect to eccentric shaft 60 adjoining pulley 61 is clutch and brake assembly 65 as well known in the art. Eccentric shaft 60 has keyed thereon sprocket 66 which interconnects by chain 67 with sprocket 68 on top dead center switch 70 (FIGURE 2) which assures that the turret drive only functions when the ram 54 is at its uppermost position.

Each operative position of the turrets has at a diametrically opposite position a registry pin opening 71 in each turret, and when the turrets are in correct alignment a registry pin 72 guided by a sliding guide 73 is inserted into the registry pin opening 71. The registry pins are suitably tapered at the forward end so that they can assure precise positioning of the turrets by bringing the turrets into the exact proper position if they stop slightly out of alignment with the registry pins.

The registry pins are operated in any suitable manner, conveniently by bell cranks 74 pivoted on the frame at 75 and at one end extending into slot 76 at the rearward ends of the pins. The opposite ends of the bell cranks pivotedly connect at 77 with a link 78 which in turn pivotedly connects at 80 with a second link 81 which pivotedly connects at 82 with the ram 83 of double acting pneumatic cylinder 84 which is actuated by pneumatic valves connecting to the opposite ends at selected times as later described.

Figure 11:
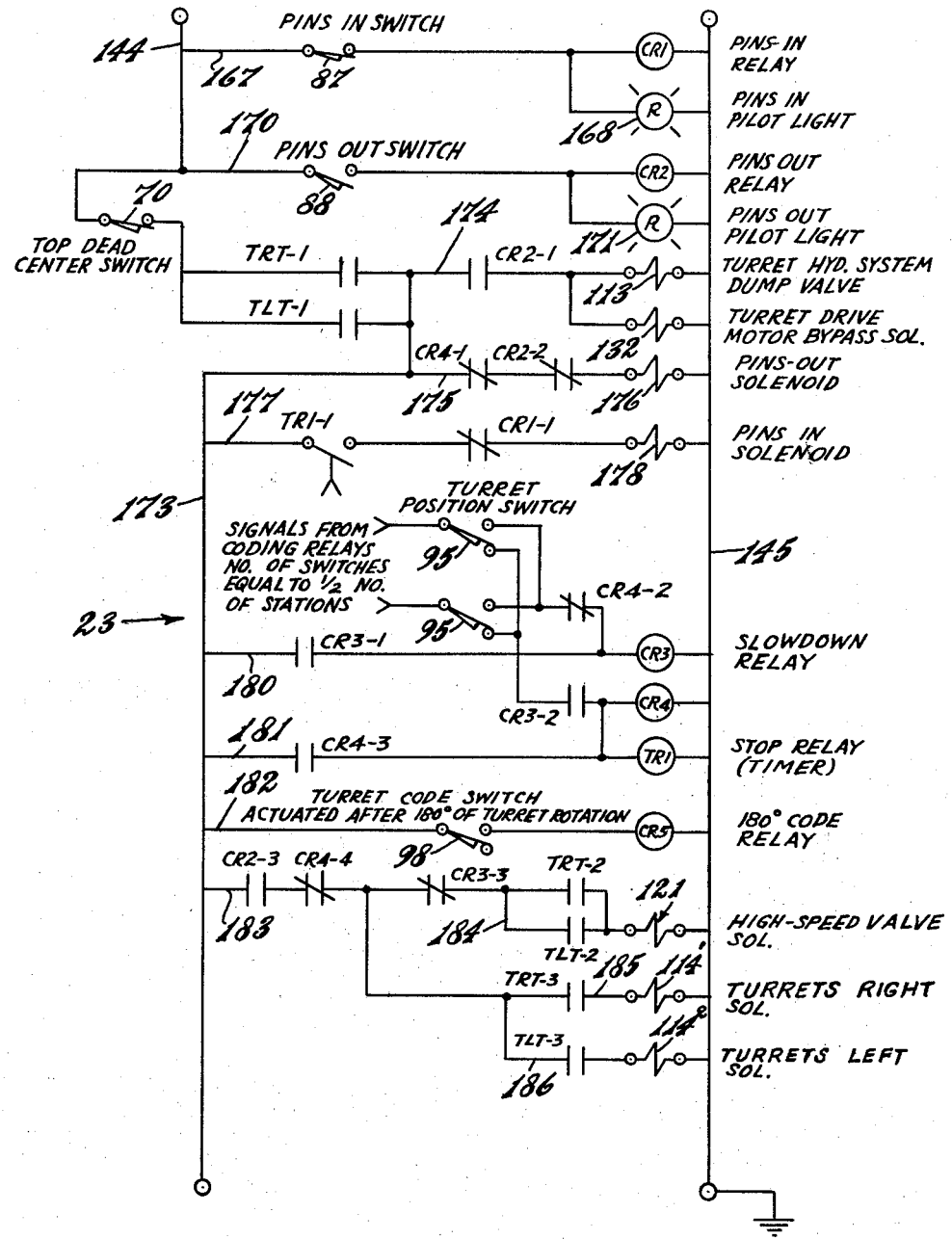
FIGURE 11 is an electric circuit diagram showing the index pin and valve control employed in the device of the invention.

The link 78 mounts thereon abutments 85 and 86 which in opposing limiting positions respectively engage pins-in switch 87 or pins-out switch 88 (FIGURES 1 and 11).

Provision between the punch and the die is made for inserting work at 90, suitably a metallic sheet or a plate, and a chute 91 is provided to receive the slugs produced.

The rotary cam limit switch controller has keyed thereon a plurality of cams 92 (FIGURES 3, 4 and 5) each of which suitably has two sets of humps 93 and 94. There are enough cams 92 for half of the number of stations.

Figure 3:
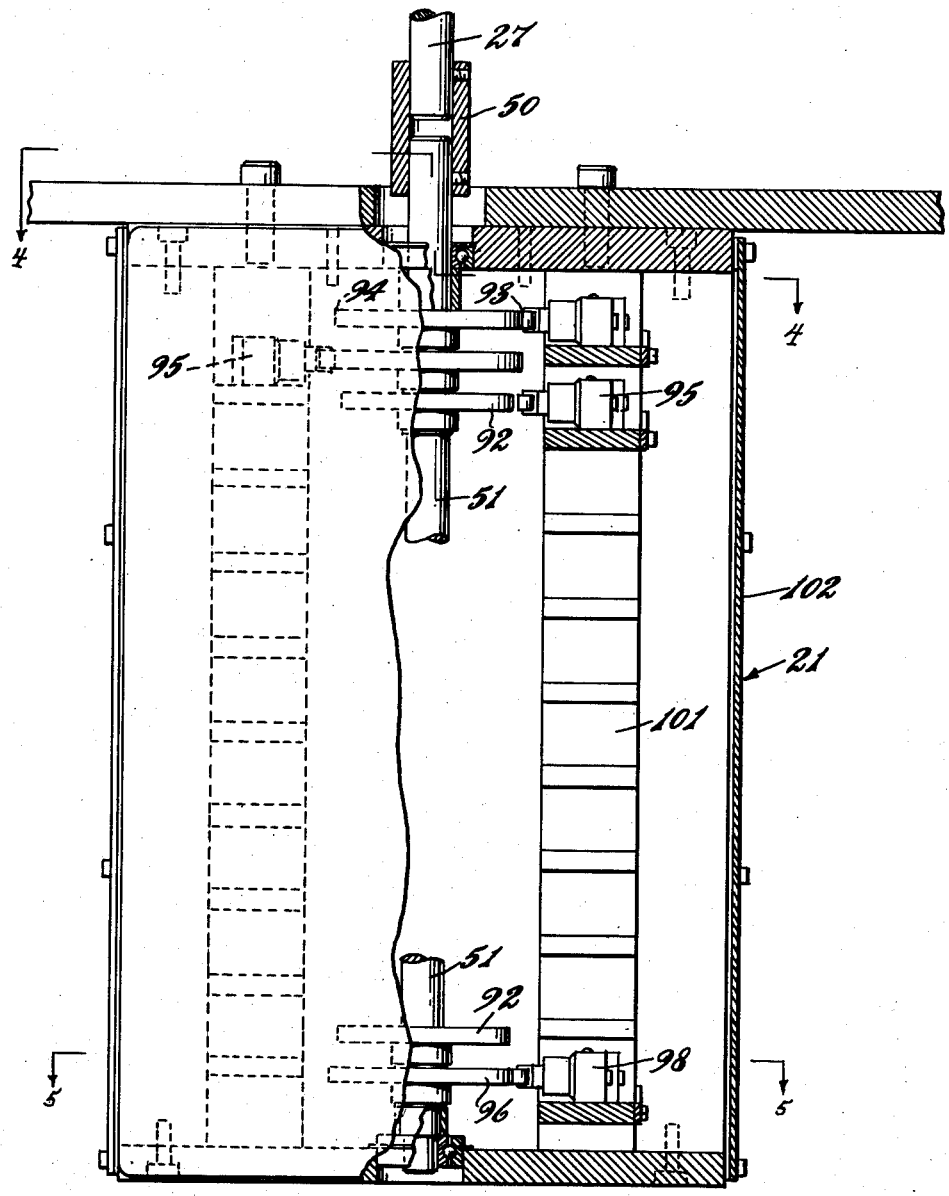
FIGURE 3 is a fragmentary front elevation of the rotary cam limit switch controller of the invention greatly enlarged with respect to FIGURE 1, and having the front cover partially broken away, the view being partially sectioned on the line 3—3 of FIGURE 4.
Figure 4:
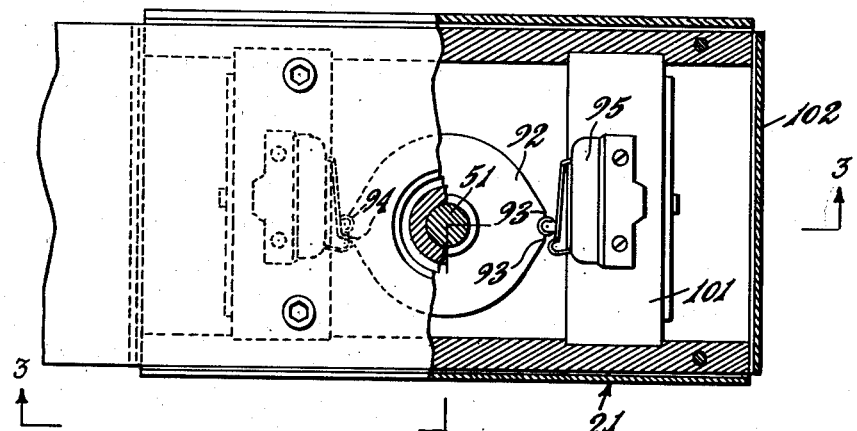
FIGURE 4 is a plan section on the line 4—4 of FIGURE 3.
Figure 5:
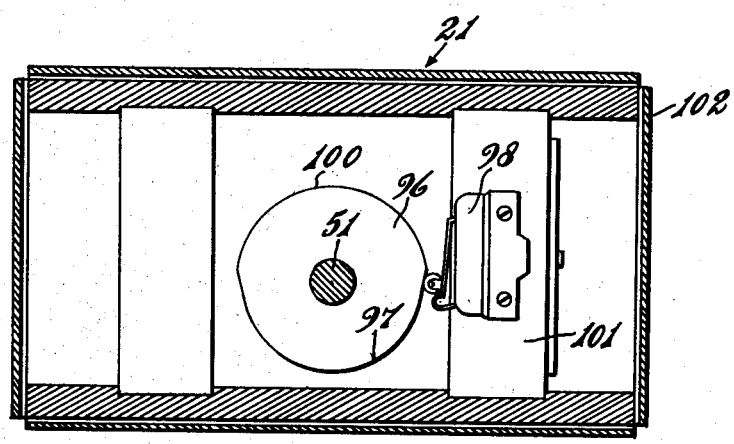
FIGURE 5 is a plan section on the line 5—5 of FIGURE 3.

Each of the cams 92 has cooperating therewith one of the switches 95, the switches desirably being placed in staggered relation on opposite sides as shown in FIGURE 3.

All points on the cam 92 cause the switch 95 to open except the humps 93 and 94 of which there are two closely adjacent so that they will influence the switch to close regardless of whether the shaft 51 is turning in one direction or the other. Also keyed on shaft 51 is a 180° cam 96, best seen in FIGURES 3 and 5, which has one 180° portion 97 in which its cooperating switch 98 is in one limiting position and one 180° portion 100 in which the cooperating switch 98 is in the opposite limiting position.

The switches are mounted on insulating panels 101 and surrounded by a suitable housing 102.

The tripping points at which the cam projections 93 and 94 are located are desirably positioned about 10° from the point at which deactivating is accomplished, which corresponds exactly to the station location. The deactivating point will always remain circumferentially in line with the station location on the turret. The transition from the small to the large radius on the 180° cam 96 is accomplished by a smooth curve and the tripping point is at the point of transition from the smaller to the larger radius.

The determination as to which cam is to be effective on a particular one of the switches 95 depends upon the operation of the 180° cam 96 as later explained.

The hydraulic system of the invention is best seen in FIGURE 6. An electric motor 103 drives the pump 104 which receives hydraulic fluid from a sump 105 and which has a suitable compensator control 106.

Output takes place through line 107 which has suitable pressure gage indicating means 108, and discharges through filter 110 to main pressure supply line 111 which has an unloading valve 112 closed by solenoid 113 connecting back to the reservoir. Valve 112 is a 2-way, solenoid operated, normally open, spring offset valve. Line 111 connects to double solenoid operated, spring centered, 4-way, closed center, direction control valve 114, which has at the output side alternate directional lines 115 and 116 and has also a connection to line 117 connected to low speed flow control valve 118 which is a pressure and temperature compensated flow control valve capable of discharging to reservoir 105.

Line 117 also connects to high speed valve 120 which is controlled by solenoid 121 and is a normally closed spring offset valve. The directional output lines 115 and 116 connect through high speed flow control valves 122 and 123 respectively to turret drive motor 48. Connected across between lines 115 and 116 ahead of the high speed flow control valves 122 and 123 is a cross connection 125 which has opposed check valves 126 and 127 and an intermediate connection to turret deceleration relief valve 128 which is an adjustable pressure-responsive spring-operated relief valve connected to reservoir 105. Also across between lines 115 and 116 ahead of the high speed flow control valves 122 and 123 is a cross connection 130 provided with a turret drive motor bypass valve 131 operated by solenoid 132. This valve is the same construction as valve 112.

The input of data to operate the system and the electrical system which controls the hydraulic mechanism are best seen in FIGURES 7 to 11 inclusive. Tape information is suitably punched on a tape 141 progressing in the direction of the arrow as shown in FIGURE 8. This tape information involves three different rows each of which has four possible reading positions, but not all of which are necessarily required. Thus the presence of a hole or blank at 142 controls the operation of reader or pick-off switch 143 to energize relay CRD1 between energized lead 144 and grounded lead 145 as shown in FIGURE 7. Likewise, the presence of a blank or hole at 146 will control the energization of reader or pick-off switch 147 to energize relay CRD2. In the same third row, the presence of a hole or blank in the tape at position 148 controls the energization of reader or pick-off switch 150 which determines the energization of relay CRD4.

The next line of holes 151 are feeder holes for the feeder sprocket of the tape.

The presence of a hole or blank at position 152 determines whether or not reader or pick-off switch 153 is closed to energize relay CRD8.

This third row of positions 142, 146, 148 and 152 is known as the units digit and relay CRD1, CRD2, CRD4 and CRD8 correspond to the units digit.

In the second row of tape positions, the presence of a hole or blank at position 154 determines whether or not reader or pick-off switch 155 is closed to energize relay CRD10 which is one of the tens digit relays. Likewise, the presence of a hole or punch at position 156 determines whether or not reader or pick-off switch 157 is closed to energize relay CRD20, which is the second of the tens digit relays. The remaining positions in this row are not used.

In the first row the presence of a hole or blank at position 158 controls whether reader or pick-off switch 160 is closed to energize relay TRT of the auxiliary function turret code relay series which turns the turret to the right. The presence of a hole or blank at position 161 determines whether reader or pick-off switch 162 is closed to energize relay TLT which controls turret operation to the left.

It will be evident that all of these relays are separately connected in series with their controlling readers or pick-off switches across the power source in parallel branches as shown in FIGURE 7.

The reader or pick-off switch will suitably be of the type which has extending contacts urged to a position to make contact, but which are obstructed from making contact by the tape except where an opening is present. At those locations where the tape is punched, the contacts are free to close, sending input signals to the appropriate relays.

Figure 9:
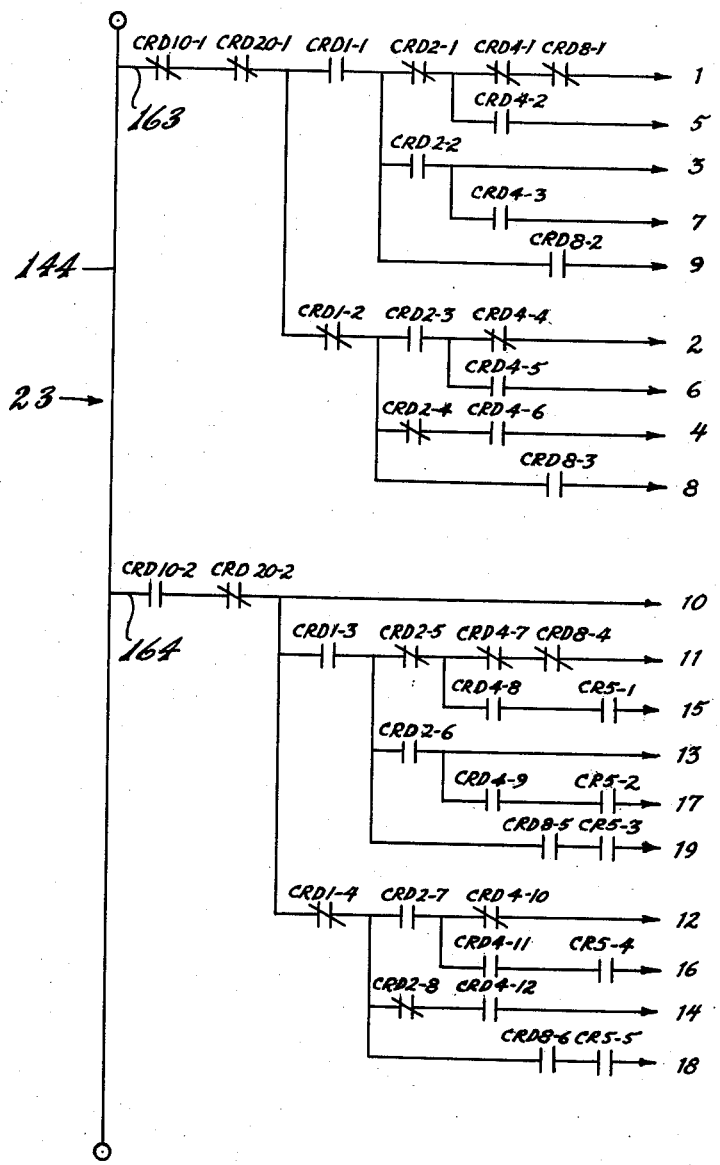
FIGURE 9 is an electric circuit diagram of a relay matrix according to the invention showing stations 1 to 19.
Figure 10:
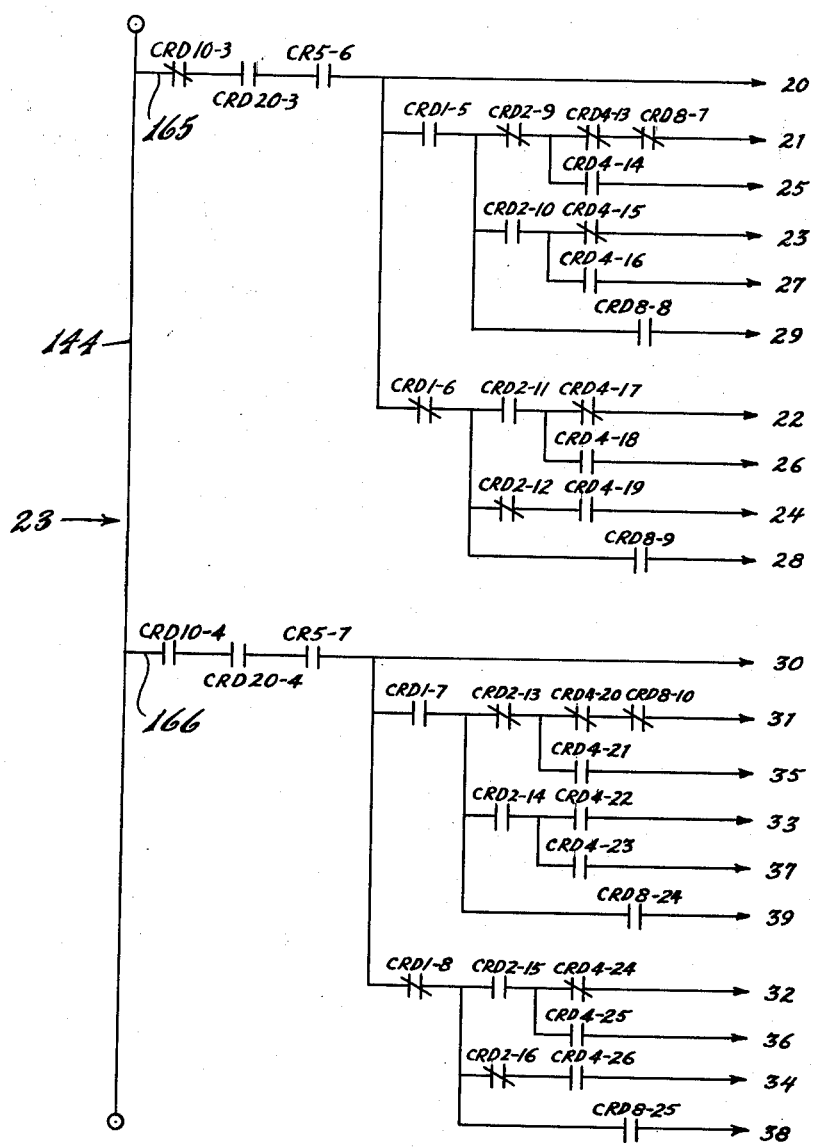
FIGURE 10 is an electric circuit diagram of a relay matrix showing stations 20–39.

In FIGURES 9 and 10, the ungrounded side of the power source 144 is connected to four different parallel circuit branches 163, 164, 165 and 166 each of which breaks down into individual parallel branches which are connected to ground through one of the switches 95 shown in FIGURE 3. At the righthand side where arrows are used indicating connections to the switches, numbers from 1 to 39 appear, indicating that each of the appropriate circuit branches functions to energize the selection of the correspondingly numbered turret position.

In FIGURE 9 circuit branch 163 includes normally closed contacts 1 of relay CRD10, designated for convenience CRD10–1 and normally closed contacts 1 of relay CRD20, designated for convenience CRD20–1. In addition branch 1 includes normally open relay contacts CRD–1 and normally closed relay contacts CRD2–1, CRD4–1 and CRD8–1.

Position 2 has a parallel circuit branch which includes normally closed relay contacts CRD10–1, CRD20–1 and CRD1–2, normally open relay contacts CRD2–3 and normally closed relay contacts CRD4–4.

The circuit branch for turret position 3 has parallel branches which place in series normally closed relay contacts CRD10–1 and CRD20–1 and normally open relay contacts CRD1–1 and CRD2–2.

The sub-branches for turret position 4 includes in series normally closed relay contacts CRD10–1, CRD20–1, CRD1–2 and CRD2–4 and normally open relay contacts CRD4–6.

The circuit sub-branches for turret position 5 include normally closed relay contacts CRD10–1, CRD20–1, normally open relay contacts CRD1–1, normally closed relay contacts CRD2–1 and normally open relay contacts CRD4–2.

For turret position 6 the circuit sub-branches include normally closed relay contacts CRD10–1, CRD20–1 and CRD1–2 and normally open relay contacts CRD2–3 and CRD4–5.

The circuit branch for setting up turret position 7 includes normally closed relay contacts CRD10–1 and CRD20–1 and normally open relay contacts CRD1–1, CRD2–2 and CRD4–3.

For turret position 8 the circuit sub-branches include normally closed relay contacts CRD10–1, CRD20–1 and CRD1–2 and normally open relay contacts CRD8–3.

For turret position 9 the circuit sub-branches include normally closed relay contacts CRD10–1 and CRD20–1 and normally open relay contacts CRD1–1 and CRD8–2.

For turret position 10, circuit branch 164 is used having normally open relay contacts CRD10–2 and normally closed relay contacts CRD20–2 in series to the appropriate switch 95 and to ground.

For turret position 11, the circuit sub-branches include normally open relay contacts CRD10–2, normally closed relay contacts CRD20–2, normally open relay contacts CRD1–3 and normally closed relay contacts CRD2–5, CRD4–7 and CRD8–4.

For turret position 12, the circuit sub-branches include normally open relay contacts CRD10–2, normally closed relay contacts CRD20–2, normally closed relay contacts CRD1–4, normally open relay contacts CRD2–7 and normally closed relay contacts CRD4–10.

For turret position 13, the relay matrix includes normally open relay contacts CRD10–2, normally closed relay contacts CRD20–2, and normally open relay contacts CRD1–3 and CRD2–6.

For turret position 15, the circuit sub-branches include normally open relay contacts CRD10–2, normally closed relay contacts CRD20–2, CRD1–4 and CRD2–8 and normally open relay contacts CRD4–12.

For turret position 15, the circuit sub-branches include normally open relay contacts CRD10–2, normally closed relay contacts CRD20–2, normally open relay contacts CRD1–3, normally closed relay contacts CRD2–5 and normally open relay contacts CRD4–8 and CR5–1.

Relay CR5 as later explained is energized by turret code switch 98 actuated after 180° of turret rotation.

For turret position 16, the circuit sub-branches include normally open relay contacts CRD10–2, normally closed relay contacts CRD20–2 and CRD1–4, and normally open relay contacts CRD2–7, CRD4–11 and CR5–4.

Turret position 17 is achieved by circuit branches which include normally open relay contacts CRD10–2, normally closed relay contacts CRD20–2, and normally open relay contacts CRD1–3, CRD2–6, CRD4–9 and CR5–2.

For position 18, the relay matrix includes normally open relay contacts CRD10–2, normally closed relay contacts CRD20–2 and CRD1–4 and normally open relay contacts CRD8–6 and CR5–5.

For turret position 19, the circuit sub-branches include normally open relay contacts CRD10–2, normally closed relay contacts CRD20–2 and normally open relay contacts CRD1–3, CRD8–5 and CR5–3.

Referring now to FIGURE 10, for turret position 20 the relay contacts in series are normally closed relay contacts CRD10–3 and normally open relay contacts CRD20–3 and CR5–6.

For turret position 21, the relay matrix includes normally closed relay contacts CRD10–3, normally open relay contacts CRD20–3, CR5–6 and CRD1–5 and normally closed relay contacts CRD2–9, CRD4–13 and CRD8–7.

For turret position 22, the circuit sub-branches include normally closed relay contacts CRD10–3, normally open relay contacts CRD20–3 and CR5–6, normally closed relay contacts CRD1–6, normally open relay contacts CRD2–11 and normally closed relay contacts CRD4–17.

For turret position 23, the circuit sub-branches include normally closed relay contacts CRD10–3, normally open relay contacts CRD20–3, CR5–6, CRD1–5, and CRD2–10 and normally closed relay contacts CRD4–15.

For turret position 24, the relay matrix includes normally closed relay contacts CRD10–3, normally open relay contacts CRD20–3 and CR5–6, normally closed relay contacts CRD1–6, and CRD2–12, and normally open relay contacts CRD4–19.

For turret position 25, the circuit sub-branches include normally closed relay contacts CRD10–3, normally open relay contacts CRD20–3, CR5–6 and CRD1–5, normally closed relay contacts CRD2–9 and normally open relay contacts CRD4–14.

For turret position 26, the relay matrix includes normally closed relay contacts CRD10–3, normally open relay contacts CRD20–3 and CR5–6, normally closed relay contacts CRD1–6 and normally open relay contacts CRD2–11 and CRD4–18.

For turret position 27, the circuit sub-branches include normally closed relay contacts CRD10–3 and normally open relay contacts CRD20–3, CR5–6, CRD1–5, CRD2–10 and CRD4–16.

For turret position 28, the relay matrix includes normally closed relay contacts CRD10–3, normally open relay contacts CRD20–3 and CR5–6, normally closed relay contacts CRD1–6 and normally open relay contacts CRD8–9.

For position 29 on the turret, the circuit sub-branches include normally closed relay contacts CRD10–3 and normally open relay contacts CRD20–3, CR5–6, CRD1–5 and CRD8–8.

For turret position 30, using circuit branch 166, the relay contacts in series are normally open relay contacts CRD10–4, CRD20–4 and CR5–7.

In the case of turret position 31, the circuit sub-branches include normally open relay contacts CRD10–4, CRD20–4, CR5–7 and CRD1–7 and the normally closed relay contacts CRD2–13, CRD4–20 and CRD8–10.

For turret position 32, the relay matrix includes normally open relay contacts CRD10–4, CRD20–4 and CR5–7, normally closed relay contacts CRD1–8, normally open relay contacts CRD2–15 and normally closed relay contacts CRD4–24.

For turret position 33, the circuit sub-branches include normally open relay contacts CRD10–4, CRD20–4, CR5–7, CRD1–7, CRD2–14 and CRD4–22.

For turret position 34, the relay matrix includes normally open relay contacts CRD10–4, CRD20–4 and CR5–7, normally closed relay contacts CRD1–8 and CRD2–16 and normally open relay contacts CRD4–26.

For turret position 35, the circuit sub-branches include normally open relay contacts CRD10–4, CRD20–4, CR5-7 and CRD1-7, normally closed relay contacts CRD2-13 and normally open relay contacts CRD4-21.

For turret position 36, the circuit sub-branches include normally open relay contacts CRD10-4, CRD20-4 and CR5-7, normally closed relay contacts CRD1-8 and normally open relay contacts CRD2-15 and CRD4-25.

For turret position 37, the circuit sub-branches include normally open relay contacts CRD10-4, CRD20-4, CR5-7, CRD1-7, CRD2-14 and CRD4-23.

For turret position 38, the relay matrix includes normally open relay contacts CRD10-4, CRD20-4, CR5-7, normally closed relay contacts CRD1-8 and normally open relay contacts CRD8-25.

For turret position 39, the relay matrix includes normally open relay contacts CRD10-4, CRD20-4, CR5-7, CRD1-7 and CRD8-24.

Referring now to FIGURE 11, circuit branch 167 is connected across between electric power leads 144 and 145 (suitably A.C.) through pins-in switch 87 which, it will be remembered, responds to the fact that registry pins 72 are engaging in turret registry pin opening 71, which is in series with relay CR1, and locally in parallel with pins-in pilot light 168.

In parallel with circuit branch 167 is circuit branch 170 which is connected across the lines 144 and 145 through pins-out-switch 88 which is in series with relay CR2 and locally in parallel with pins-out pilot light 171.

All of the rest of the circuit of FIGURE 11 connects through top dead center switch 70 which closes when ram 54 is in its uppermost position. Switch 70 connects alternately through one of the open contacts TRT-1 or TLT-1 in parallel with one another, to lead 173 which is in turn connected across to ground and line 145' through various other circuit branches.

Relays TRT and TLT are shown in FIGURE 7 and are energized by input signals from the output reader.

Across from lead 173 to the grounded side 145 of the power line is connected circuit branch 174 through normally open relay contacts CR2-1 and solenoid 113 of turret hydraulic system unloading valve 112 as shown on FIGURE 6.

Also in parallel across from lead 173 to ground is circuit branch 175 which includes normally closed relay contacts CR4-1 and CR2-2 and pins-out solenoid 176 which controls the valve admitting air pressure to the end of air cylinder 84 which moves the pins out of the registry pin openings 71.

Another parallel circuit 177 across from lead 173 to ground includes relay contact TR1-1, which has a time delay, and which is in series with normally closed contacts CR1-1 and solenoid 178 which opens the valve which actuates air cylinder 84 to move the pins into alignment opening 71.

Each of the turret position switches 95, shown for example on FIGURE 3, when the turret reaches a point close to the alignment position, suitably 10° therefrom, as shown on FIGURE 11, shifts from a position in which it connects from the ungrounded side of the line through normally closed relay contacts CR4-2 and slow-down relay CR3 to ground, and thence to a new position at which it connects through normally open contacts CR3-2 and relay CR4 to ground and also in parallel with relay CR4 through stop relay TR1 to ground.

Circuit branch 180 connects from lead 173 through normally open relay contacts CR3-1 and also through slow down relay CR3 to the grounded side 145 of the line. Circuit branch 181 connects through normally open relay contacts CR4-3 and stop timer TR1 to the grounded side 145 of the line.

Circuit branch 182 connects through turret code switch 98 which is actuated after 180° of turret rotation through relay CR5 to the grounded side 145 of the line.

Circuit branch 183 connects through normally open contacts CR2-3, normally closed contacts CR4-4 and CR3-3, normally open contacts TRT-2 and solenoid 121 of the high speed valve 120 to the grounded side 145 of the line. Auxiliary circuit branch 184 connects through normally open relay contacts CR2-3, normally closed relay contacts CR4-4, and CR3-3, normally open relay contacts TLT-2, and solenoid 121 of high speed valve 120.

In another auxiliary circuit branch 185 are placed normally open relay contains CH2-3, normally closed relay contacts CR4-4, normally open relay contacts TRT-3 and turrets-right solenoid 114' of turret drive direction control valve 114.

In auxiliary circuit branch 186 are placed normally open relay contacts CR2-3, normally closed relay contacts CR4-4, normally open relay contacts TLT-3 and turrets-left solenoid $114^2$ of turret drive direction control valve 114.

*Operation*

When the tape 141 advances to the next position at which data is taken off, suitable contacting devices or reading mechanism, individually well known in the art, simultaneously takes off data from holes or imperforate places at 142, 146, 148, 152, 154, 156, 158, and 161. It should be mentioned, however, that if it is desired at the next indexing point of the tape to have the turret in the same position there will simply be no perforations whatever in the tape at the new location.

Positions 158 and 161 are interrelated and whenever there is a punch mark at position 158 indicating turning of the turret to the right there will be an imperforate tape at 161 and likewise when 161 is perforated indicating turning of the turret to the left, 158 will be imperforate.

As previously explained, the tens digit will be determined by positions 154 and 156 on the tape and the units digit will be determined by positions 142, 146, 148 and 152 on the tape.

Assuming that position 158 indicating turret turning to the right is punched at the particular location, and the switch 160 closes, turret right turn relay TRT is energized, and this closes normally open relay contacts TRT1, TRT2 and TRT3 on FIGURE 11. This predisposes the device to move to the right when other action to be described takes place.

The reader switch at tape position 142 closes at 143 energizing relay CRD-1 which causes relay contacts CRD1-1, CRD1-3, CRD1-5 and CRD1-7 to close and relay contacts CRD1-2, CRD1-4, CRD1-6 and CRD1-8 to open. Likewise, the reader at tape position 152 causes closing of switch 153 which energizes relay CRD-8 which opens relay contacts CRD8-1, CRD8-4, CRD8-7, CRD8-10, and closes relay contacts CRD8-2, CRD8-3, CRD8-5, CRD8-6, CRD8-8, CRD8-9, CRD8-24 and CRD8-25. Assuming that there is no hole punched in the tens digit line at 154 or 156 there will be no relay energized at that position and therefore the only relay energized on FIGURE 7 will be CRD-1 and CRD-8 and TRT.

By reference to FIGURE 9 it will be seen that the only circuit completed is that for position 9, which extends through the normally closed contacts CRD10-1 and CRD20-1, through the normally open contacts CRD1-1 which have now closed, and then through the normally open contacts CRD8-2 which have now closed.

All other outputs on FIGURE 9 have open circuits. Assuming that we will move from position 1 to position 9, output 9 passes to the turret locating switch 95 which corresponds to station 9. Contact TRT-1, TRT-2 and TRT-3 of relay TRT close performing the following functions:

TRT-2 sets up a circuit to energize solenoid 121 of high speed valve 120 and TRT-3 sets up a circuit to energize turrets right solenoid 114' to shift turret drive direction control valve 114 so as to previously position the hydraulic system of FIGURE 6 to turn the turret to the right when further action takes place. Energized relay TRT closed the contacts TRT-1 to energize pins-out solenoid 176 to withdraw the pins through normally closed contacts CR4–1 and CR2–2. The pins retract and this deactivates the pins-in switch 87 and activates pins-out switch 88. Deactivation of the pins-in switch 87 deenergized pins-in relay CR1 and this causes contacts CR1–1 to close, setting up circuit branch 177 to energize the pins-in solenoid 178 at the proper time.

Pins-out limit switch 88 energizes pins-out relay CR2, and this causes contacts CR2–1 to close, energizing solenoid 113 of unloading valve 112 and also energizing solenoid 132 of bypass valve 131. This applies pressure to the system for turret motion. Contacts CR2–2 open, locking out pins-out solenoid 176. Contacts CR2–3 close, energizing the turrets right solenoid 114' through normally closed relay contacts CR4–4 and relay contacts TRT–3 which have previously been closed as explained above. Also at the same time high speed valve solenoid 121 is energized through normally closed relay contacts CR3–3 and through relay contacts TRT–2 which have previously been closed.

It will be evident that each of the turret position switches 95 has two positions. If the turrets are intended to move through a relatively small angle, say less than 10°, then the position switch 95 in relation to its corresponding cam will be in the slow down position in which it energizes slow down relay CR3 through normally closed relay contacts CR4–2, and when slow down relay CR3 is energized this causes normally closed relay contacts CR3–3 to open and this prevents solenoid 121 from energizing so that the high speed valve 120 is closed, cutting down on the return and therefore cutting down on the available supply of hydraulic fluid for propulsion of the turrets. This limits the speed of the turrets to low speed only. On the other hand, if the angle of intended turret motion exceeds 10°, then the corresponding turret position switch 95 is in such a position that slow down relay CR3 is deenergized. This assures that advance will take place at high speed. This is accomplished because TRT–2 or TLT–2 is closed, and relay contacts CR2–3, CR4–4 and CR3–3 are closed.

The turrets then turn in the selected direction toward the desired station. As the only turret position switch which is receiving a signal is the turret position switch representing the desired station to which the turrets are moving, the turrets turn until this position is approached within 10°. Assuming that the turrets are moving more than 10° and therefore are moving at high speed, when the turrets reach a position 10° from the desired new station, the turret position switch 95 is actuated by a cam lobe and this energizes slow down relay CR3 through normally closed contacts CR4–2. When slow down relay CR3 closes this first closes locking contact CR3–1. Then slow down relay contacts CR3–2 close, setting up the circuit which will later energize the stop relay at the proper position. Contacts CR3–3 open, and this deenergizes the high speed hydraulic valve solenoid 121 to close high speed hydraulic valve 120. The turrets then decelerate from high speed to low speed but continue to creep under the action of low speed operation toward the desired station. At approximately one degree short of the exact station position the turret position switch 95 is deactuated by its cam, moving to the position at which it now energizes stop relay TR1 through previously closed contact CR3–2 and also energizes relay CR4. This opens relay contact CR4–1, deenergizing pins-out solenoid 176. Relay contacts CR4–2 open, locking out the slow down relay circuit. Relay contacts CR4–3 close, energizing the stop relay solenoid TR1, which being a time delay relay is not effective until it times out. Relay contacts CR4—4 open, and this deenergizes the particular one of the solenoids 114' or 114² which is energized, closing turret direction control valve 114, and thus stopping the turrrets. There is thus a hydraulic braking action exerted to stop the turrets.

Stop relay contacts TR1—1 delay, allowing the turrets to come to a full stop, and then close, energizing pins-in solenoid 178 through closed relay contacts CR1—1. The pins move forward, pins-out solenoid 176 having previously been deenergized. Pins-out switch 88 opens and this deenergizes pins-out relay CR2 which opens contacts CR2–1 causing solenoid 113 of pump unloading valve 112 to deenergize, thus causing the pump unloading valve to open and to unload the pump back to reservoir. This also deenergizes solenoid 132 which opens turret drive motor bypass valve 131, and this removes hydraulic locking from the system and allows the turret to move freely for final alignment as the tapered ends of the index pins enter the corresponding indexing sockets of the turrets. Relay contacts CR2—2 close which interrupts the pins-out solenoid circuit and relay contacts CR2—3 open, but no action is produced. When the pins are fully seated in the turret sockets, pins-in switch 87 closes energizing pins-in relay CR1 and this causes contacts CR1—1 to open, which deenergize pins-in solenoid 178. All relays which have been locked in are deenergized when the tape moves to the next information station.

Turret operation for a station 180 degrees from the station noted above is the same except that the turret code switch 98 is then energized to energize 180 degree code relay CR5. As long as relay CR5 is energized it prevents a signal from entering the switch 95 which is at the wrong 180 degree position of the circumference corresponding to the complementary 180 degree station, but as soon as the turrets have moved to the correct 180 degree position turret code switch 98 opens and 180 degree code relay CR5 is deenergized so that the correct turret position switch at the correct half of the circumference can be properly energized.

It will be evident that the turret drive low speed flow control valve accomplishes effective metering of the quantity of hydraulic fluid which can pass through the hydraulic motor and thus is effective as a control of the speed. By varying the adjustment of valve 118 it is thus possible to vary the slow speed setting of the system. The location of the turret drive low speed flow control valve at the output side of the system with respect to the hydraulic motor is important in the present invention, since it secures a metered circuit which contributes important braking action to prevent the high inertia of the turrets from driving the hydraulic motor, and thus overshooting the turret stopping position.

It will also be evident that valves 122 and 123 exert a similar control in the case of the high speed drive, but it is there less important since there is an opportunity to properly correct during low speed drive any inertia effect.

It should furthermore be emphasized that it is important that valve 118 causes a consistent behavior of the turrets each time so that they will always come to a stop within one-quarter degree of arc and will not require any undue centering motion by the pins.

The two check valves 126 and 127 and the relief valve 128 are located in the circuit in such a position that the relief valve 128 limits maximum acceleration and deceleration which can possibly be applied to the turrets by permitting one check valve or the other to open and the relief valve to open and relieve excessive pressure back to the reservoir. Due to the high speed of the solenoid valves 114 and 120 in the circuit, hydraulic surge pressures can occur as well as too rapid deceleration especially during the centering of the direction control valve 114. The relief valve 128 serves the purpose therefore of limiting both excessive pressures and excessive accelerations and decelerations and thus safeguards both the hydraulic system and also the turrets themselves from mechanical damage.

*Proximity stopping mechanism*

The device as previously described operates very effectively unless the number of stations on the turret is very large. When very numerous stations are employed, the angle between stations is small, and more difficulty is encountered in discriminating between stations and stopping precisely at the correct station. For this purpose we provide a proximity stopping device which is made more precise in its discrimination of small angles.

The proximity stopping device also permits programming the same station any desired number of times without danger of malfunction of the turret. It is also possible with the proximity stopping device to approach a particular station from either direction without danger of error.

Referring now to FIGURES 12 to 16 inclusive the coupling 50 which is on the axis and responds precisely to turret position has mounted on the lower end thereof, transverse to the axis, a proximity actuator 190 which is a metallic disk suitably of steel secured to the coupling 50 by a locator pin 191 and screws 192 passing through openings 193 in the proximity actuator.

Figure 14A:
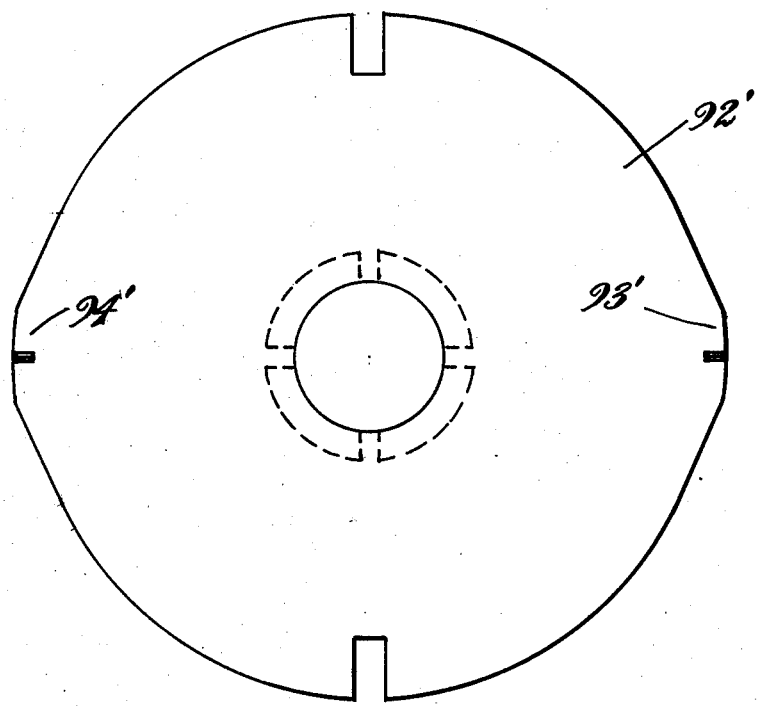
FIGURE 14a is a detail plan view of a modified position cam.

The coupling 50 has an extension shaft 194 at the axis which passes through central opening 195 of the proximity actuator and connects to coupling 196 which connects by shaft 51 to the cams 92' of FIGURE 14a arranged axially in the same manner as the arrangement of cams 92 in FIGURE 3.

Each of the cams 92' has cooperating therewith one of the switches 95 as previously described, the switches desirably being placed in staggered relation on opposite sides as shown in FIGURE 3. Cams 92' have humps 93' and 94' corresponding to the humps 93 and 94 of cams 92, but at no point in the humps is there a depression whereby the follower of switch 95 can spring radially inwardly on the cam to deactuate the switch 95. In this embodiment of the invention, switch 95 is always activated, since the exact position signal is taken from the proximity actuator 190.

The proximity actuator 190 has corresponding to each odd numbered station a series of slots 197 distributed around the outer circumference and also has corresponding to each even numbered station a series of slots 198 distributed around the circumference at a position closer to the axis.

The slots 197 and 198 are previously aligned with the station position angularly so that the imaginary radial line down the center of each slot is exactly at the station position.

Mounted on the frame beneath the proximity actuator are brackets 200 and 201 which connect by hold down bolts 202 and leveling screws 203 with a support 204 which extends horizontally across between the brackets and which has an opening 205 near the center to pass shaft 51 and coupling 196.

Mounted on the support 204 by screws 205 are benches 206 which have brackets 207 and 208 secured thereto at the top by screws 210.

The bracket 207 mounts sensing element 211 of a proximity control relay which has the same radial position as the slots 197 for the odd numbered stations. The bracket 208 supports the sensing element 212 of a proximity control relay which has the same radial position as the slots 198 for the even numbered stations.

The proximity control relay may be any proximity control relay of well known character, a suitable type being that manufactured by Electro Products Laboratories of Chicago and described in their published bulletin 4905-JIC Proximity Control Units.

The proximity control relay is conveniently energized as later explained when the turret is close to the stopping position and it remains energized until it is opposite the slot 197 or 198 as the case may be and then it deenergizes, allowing the completion of the stopping function as later explained.

Figure 15:
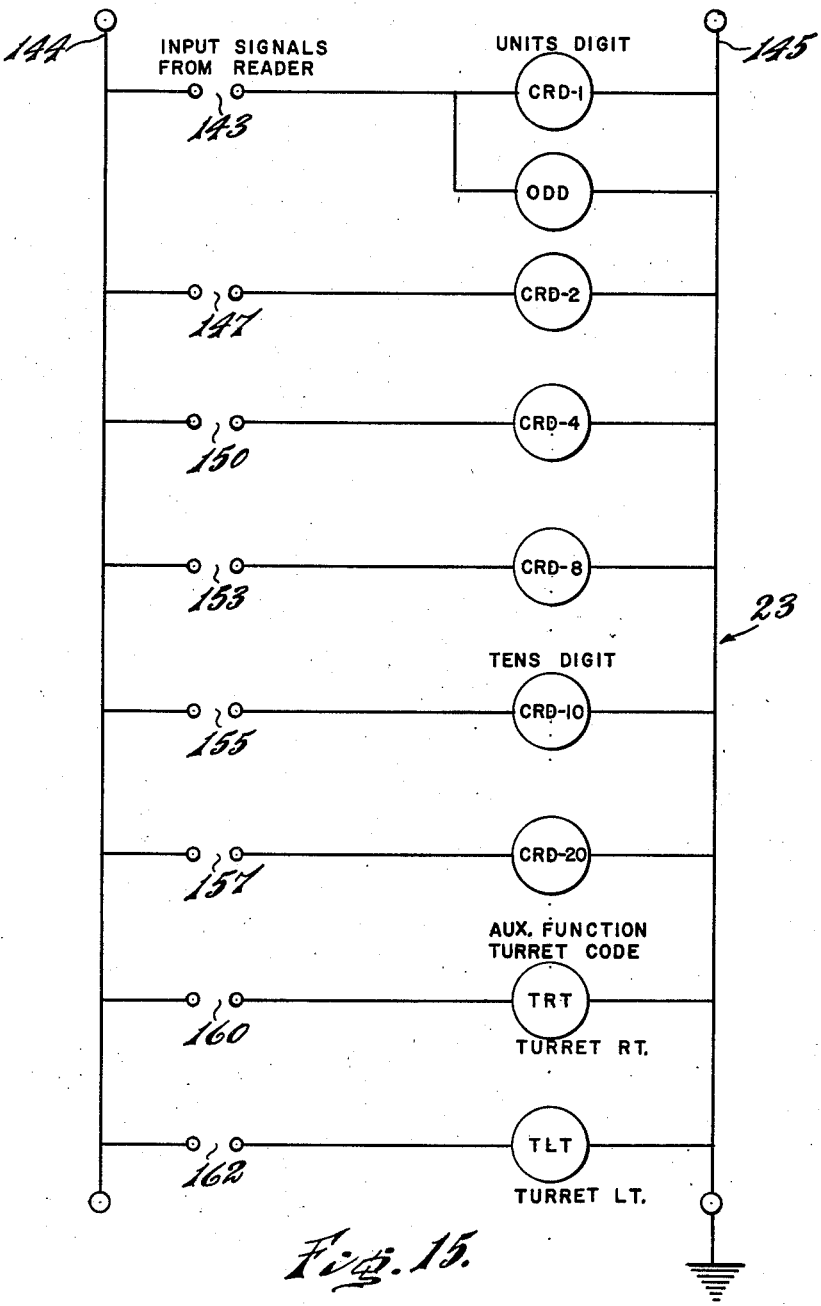
FIGURE 15 is a circuit diagram showing a variation of FIGURE 7, which is adapted to be used with the stopping device of FIGURES 12 to 14.

FIGURE 15 shows a modification of FIGURE 7 which places an Odd relay in parallel with relay CRD-1 so that it will be energized when switch 143 closes.

Referring now to FIGURE 16, it will be evident that this figure is similar to FIGURE 11 except for the stopping mechanism and the relation of the slow down to the stopping mechanism. It will be sufficient to describe the features of FIGURE 16 which differ from FIGURE 11.

Circuit branch 213 across from the power source to ground, has odd proximity control relay 1, designated Odd Prox. 1, whose sensing element has been shown at 211. Likewise in circuit branch 214, even proximity control relay 2, designated Even Prox. 2 is connected across from power lead 173 to ground.

When the turret reaches a point close to the alignment position of the particular station, suitably 10 degrees therefrom, the appropriate circuit switch 95 shown in FIGURE 16 shifts from its open position to its closed position and energizes slow down relay CR3 which is connected at the opposite side to ground. Slow down relay CR3 remains energized as the turrets creep toward the final position. When slow down relay CR3 energizes, normally open relay contacts CR3-1 close.

Circuit branch 181 connects through normally open odd relay contacts Odd 2 and normally closed odd proximity control relay contacts Odd Prox 1-1 and normally open slow down relay contacts CR3-1, through parallel branches, one of which contains relay CR4, and the other of which contains stop relay (timer) TR1, to grounded side 145 of the line. Also by a parallel branch, circuit branch 181 connects through normally closed odd relay contacts Odd-1, and normally closed even proximity control relay contacts even Prox. 2-1, and then through normally open slow down relay contacts CR3-1 to the parallel branches previously described containing relay CR4 and stop relay (timer) TR1.

In circuit branch 183, connection is made through normally open slow down relay contacts CR2-3 (when closed), normally closed relay contacts CR4-2, and normally closed slow down relay contacts CR3-2 to the parallel branches containing respective normally open turrets right relay contacts TRT-2 and normally open turrets left relay contacts TLT-2, to high speed valve solenoid 121.

*Operation*

As previously explained, each of the turret position switches 95 has two positions. If the turrets are intended to move through less than 10 degrees, then the position switch 95 in relation to its corresponding cam will be in the slow down position in which it energizes slow down relay CR3 as previously explained. When slow down relay CR3 is energized this causes normally closed relay contacts CR3-2 to open and this prevents high speed valve solenoid 121 from energizing so that the high speed valve 120 is closed, cutting down on the return hydraulic and therefore cutting down on the available supply of hydraulic liquid for propulsion of the turrets. This limits the speed of the turrets to low speed only. On the other hand, if the angle of intended turret motion exceeds 10 degrees, then the corresponding turret switch 95 is in its open position and slow down relay CR3 is deenergized. This assures that advance will take place at high speed. This is accomplished because turrets right relay TRT or turrets left relay TLT is energized one either contacts TRT-2 or TLT-2 closed and normally pins-out relay contacts CR2-3, normally closed stop relay contacts CR4-2 and normally closed slow down relay contacts CR3-2 are closed, energizing the high speed valve solenoid 121.

The turrets then turn in the selected direction toward the desired station, as the only turret position switch 95 which is receiving a signal (although still open) is the turret position switch 95 representing the desired station to which the turrets are moving, and the turrets turn until this position is approached within 10 degrees. Assuming that the turrets are moving more than 10 degrees and therefore are moving at high speed, when the turrets reach a position 10 degrees from the desired new turret station, the appropriate turret position switch 95 is actuated by its cam lobe and this energizes slow down relay CR3. When slow down relay CR3 energizes this closes normally open relay contacts CR3–1 in circuit branch 181 and this opens normally closed relay contacts CR3–2 in circuit branch 183, de-energizing high speed hydraulic valve solenoid 121 to close high speed hydraulic valve 120. The turrets then decelerate from high speed to low speed but continue to creep forward under the action of low speed operation.

It should be noted that closure of N.O. contacts CR3–1 does not energize relays CR4 and TR1 immediately. Line 181A is held deenergized by Even Prox. 2–1 contact (open at this time) when an even station has been selected. Line 181B is held deenergized by Odd Prox. 1–1 contact (open at this time) when an odd station has been selected.

At approximately ½ degree short of the exact turret position, the proximity control relay, either Odd Prox. 1 or Even Prox. 2, de-energizes, and this causes the appropriate contacts, Even Prox. 2–1 or Odd Prox. 1–1 to close in circuit branch 181A or 181B, the odd relay then being either energized or not energized depending upon the position of reader switch 143, which similarly controls relay CRD–1.

Either odd relay contacts odd–1 or odd–2 will be closed since one is normally open and the other normally closed, and slow down relay contact CR3–1 is closed since the slow down relay is still energized. When the appropriate proximity control relay de-energizes, stop relay timer TR1 and also stop relay CR4 are energized. This opens normally closed relay contacts CR4–1 and de-energizes pins-out solenoid 176. When stop relay solenoid TR1 energizes, it is a time delay device and not effective until it times out. Normally closed relay contacts CR4–2 open and this de-energizes the particular one of the turrets right or turrets left solenoid 114′ or 114² which is energized, closing turret direction control valve 114 and thus stopping the turrets. Hydraulic braking action then occurs to stop the turrets.

Stop relay contacts TR1–1 delay, allowing the turrets to come to a full stop and then close, energizing pins-in solenoid 178 through closed relay contacts CR1–1. The pins move forward, pins-out solenoid having previously been de-energized. Pins-out switch 88 opens, and this de-energizes pins-out relay CR2, which opens contacts CR2–1, causing solenoid 113 of turret hydraulic system unloading valve 112 to de-energize, thus causing the turret hydraulic system unloading valve to open and to unload the pump back to the reservoir. This also de-energizes turret drive motor bypass solenoid 132, which opens turret drive motor bypass valve 131, and this removes hydraulic locking from the system and allows the turret to move freely for final alignment as the tapered ends of the index pins enter the index pin openings of the corresponding turrets. Pins in relay contacts CR2—2 close which interrupts the pins-out solenoid circuit and pins in relay contacts CR2–3 open, but no action is produced. When the pins are fully seated in the turret socket, pins-in switch 87 closes, energizing pins-in relay CR1 and this causes contact CR1–1 to open, thus de-energizing pins-in solenoid 178.

All relays which have been locked in are de-energized when the tape moves to the next information station.

The remaining operation is that already described in connection with the form of the invention shown in FIGURES 1 to 11.

In view of our invention and disclosure variations and modifications to meet individual whim or particular need will doubtless become evident to others skilled in the art, to obtain all or part of the benefits of our invention without copying the structure shown, and we therefore, claim all such insofar as they fall within the reasonable spirit and scope of our claims.

Having thus described our invention what we claim as new and desire to secure by Letters Patent is:

1. In mechanism for positioning control, turret means adapted to turn to any one of a plurality of different angular positions, cam means interconnected with turret means and turning with said turret means, said cam means having a position corresponding to each of several different registry positions of said turret means, electric switch means operatively interconnected with said cam means, a relay matrix operatively interconnected to said electric switch means and selectively controlled by said switch means to produce a different output corresponding to the different switch means, drive means for turning said turret means and means responsive to cam operation of said switch means and selectively positioned by the relay matrix for operating said drive means and stopping said drive means at each of the turret positions.

2. A mechanism of claim 1, in combination with second cam means operatively interconnected with said turret means, and second switch means operatively following said second cam means for rendering certain portions of said relay matrix ineffective during a portion of the rotation of said turret means, and rendering selected other portions of said relay matrix operative during another part of the rotation of said turret means.

3. A mechanism of claim 2, in which said second cam means and said second switch means render certain portions of said relay matrix ineffective until said turret means passes beyond one 180 degree zone of rotation of said turret means and in which said second cam means and said second switch means render other portions of said relay matrix operative during the other 180 degree zone of rotation of said turret means.

4. A mechanism of claim 1, in combination with information input means including means for energizing selected electric circuits in accordance with numerical selection of angular positions of said turret means operatively connected to said relay matrix.

5. A mechanism of claim 4, in combination with second cam means operatively interconnected to said turret means, and second switch means operatively following second cam means for rendering certain portions of said relay matrix ineffective during a portion of the rotation of said turret means, and rendering selected other portions of said relay matrix operative during another part of the rotation of said turret means.

6. A mechanism of claim 1, in which said means for stopping comprises proximity actuator means turning with said turret means and proximity control means including an electric circuit which responds to said proximity actuator means while said proximity actuator means is still remote from the elements of said electric circuit, said electric circuit controlling said means for stopping.

7. A mechanism of claim 6, in which the proximity actuator means has a plurality of angularly disposed proximity actuator elements, and in which said proximity control means responds to only one of said proximity actuator elements when it moves to a position adjacent to said proximity control means.

8. A mechanism of claim 6, in which the proximity actuator means has a plurality of circumferentially distributed slots each of which corresponds to a different stopping position of the machinery, and in which the proximity control means is positioned along the path of motion of said slots and responds to the presence or absence of a particular slot opposite the proximity control means.

9. A mechanism of claim 1, in which said drive means includes a hydraulic motor operatively connected to said turret means for driving the same selectively in either of two directions, opposed liquid connections on opposite sides of said hydraulic motor, adapted to selectively function as input and output connections, valve means selectively connecting the input to one and the output to another of said connections, means for shifting the said valve means to one of two positions to drive said turret means in the desired direction, and means for applying hydraulic braking to said hydraulic motor as it stops.

10. A device of claim 9, in combination with means for providing a cross connection between opposite sides of said hydraulic motor after the application of hydraulic braking.

11. A device of claim 9, in combination with centering pin means cooperating with said turret means, means for withdrawing said centering pin means from said turret means prior to energizing of said hydraulic motor in a particular direction, means for providing a cross connection between opposite sides of said hydraulic motor after the application of said hydraulic braking, and means for reentering said centering pin means into engagement with said turret means after said cross connection has been provided to opposite sides of said hydraulic motor.

12. A mechanism of claim 1, having one of said cam means for each position at which said turret means is to stop, centering sockets at each registry position on said turret means, centering pin means adapted to engage with said selected centering sockets, in which said drive means comprises a hydraulic motor operatively connected to said turret means to drive the same and having opposed connections either of which may be the input and the other the output, direction control valve means connected to said hydraulic motor connections and adapted selectively to connect the input to either side and the output to the other side of said hydraulic motor, means for selectively positioning said direction control valve means in a position to drive said hydraulic motor in one direction, means for withdrawing said centering pin means, means for energizing said hydraulic motor at a high speed responsive to said cam means for the particular selected position and inoperative when the angle of travel is less than a predetermined angle, means for metering the operation of said hydraulic motor at a slower speed when operation at said high speed ceases, means for hydraulically braking said hydraulic motor before it comes to a stop, means for cross connecting the opposite sides of said hydraulic motor to permit free movement of said turret means as it comes to a stop, and means for restoring said centering pin means into engagement with said turret means after said turret means comes to a stop.

13. A mechanism of claim 12, in combination with second cam means responsive to position of said turret means, and second switch means operatively connected to said relay matrix for rendering portions of said relay matrix inoperative during a portion of the turret rotation and permitting other portions of said relay matrix to operate duing a further portion of said turret rotation.

14. A mechanism of claim 1, in which said drive means comprises a hydraulic motor operatively connected to said turret means and adapted to be driven in either direction as required, a hydraulic system connected to the two ends of said motor and adapted to transmit high pressure hydraulic liquid to one side of the drive motor and to receive output flow of hydraulic liquid from the other side of the hydraulic motor, a source of high pressure hydraulic liquid, a direction control valve interposed between the source of hydraulic liquid and the opposite connections to the hydraulic motor for discharging high pressure hydraulic liquid through one of said connections, a dump valve in the connection from the source of hydraulic liquid to the direction control valve, and in which the means for stopping the drive means includes solenoid means for closing the dump valve when the solenoid means is energized, the dump valve being biased to open and relieve the hydraulic pressure on the direction control valve, the connections and the hydraulic motor in case of failure of said relay matrix.

15. A mechanism of claim 1, in which said drive means comprises a hydraulic motor operatively connected to the turret means, a source of hydraulic liquid for driving said hydraulic motor, a direction control valve having a right turret turning position, a left turret turning position and and an intermediate closed position, solenoid operating means for moving the direction control valve to the right turret turning position, solenoid operating means for moving the direction control valve to the left turret turning position, a dump valve, solenoid operating means for closing said dump valve, a high speed flow control valve, solenoid means for closing said high speed flow control valve, a low speed flow control valve, a sump, liquid connections from said source of hydraulic liquid to the direction control valve and to the high pressure side of the dump valve, liquid connections from the direction control valve to the said hydraulic motor operative alternately as input and output depending on the position of the direction control valve, liquid connections from the direction control valve to the high speed flow control valve and to the sump, liquid connections from the direction control valve to the low speed flow control valve and to the sump, a deceleration relief valve, liquid connections from opposite sides of the hydraulic motor to the deceleration relief valve, a bypass valve, solenoid means for operating the bypass valve, liquid connections from opposite sides of the hydraulic motor to the bypass valve, registry pin means for locating said turret means in any one of a plurality of selected positions, solenoid means for actuating said registry pin means, turret right relay means, turret left relay means, means for selectively actuacting the turret right relay means or the turret left relay means, in which the relay matrix is selectively actuated to determine a particular output corresponding to a particular selected turret position and thereby energizes one of the solenoid means controlling the direction control valve and in at least some cases the solenoid means controlling the high speed flow control valve, means for energizing the solenoid means for actuating the registry pin means to withdraw said registry pin means, means for actuating the solenoid operating means for closing the dump valve, means for actuating the solenoid means in closing the bypass valve, and in which the means for stopping the drive means includes slowdown relay means, means responsive to the approach of the cam means for a selected position to a predetermined distance from the registry position for energizing said slowdown relay means, means responsive to said slowdown relay means for actuating said solenoid means for closing said high speed flow control valve, a stop relay, means responsive to the approach to registry position for actuating said stop relay and means responsive to the actuation of said stop relay for actuating the appropriate solenoid means of the direction control valve to close the same, for actuating the solenoid means of the dump valve to open the same, and for actuating the solenoid means of the bypass valve to open the same.

16. A mechanism of claim 15, in which the means responsive to the approach to registry position for actuating said stop relay comprises means actuated by said cam means controlling said stop relay.

17. A mechanism of claim 15, in which the means responsive to the approach to registry position for actuating said stop relay comprises electrical proximity mechanism having an electrical circuit whose circuit characteristics change on approach without actual contact for actuating said stop relay.

18. A mechanism of claim 15, in combination with means to render the high speed flow control valve solenoid means inoperative during the motion of the turret means so that the high speed flow control valve remains closed, said means for rendering the high speed flow control valve solenoid means inoperative being responsive to the attainment of a predetermined small angle from registry by the turret means at the time of the initiation of turret action.

19. A mechanism of claim 15, in combination with means to render the high speed flow control valve solenoid means inoperative during the motion of the turret means so that the high speed flow control valve remains closed, said means to render the high speed flow control valve solenoid means inoperative being responsive to the attainment of a predetermined small angle from registry by the turret means at the time of initiation of turret action, and in which the low speed flow control valve is located on the output side of the hydraulic motor and provides braking when the high speed flow control valve is closed.

20. A mechanism of claim 15, in combination with means to render the high speed flow control valve solenoid means inoperative during the motion of the turret means so that the high speed flow control valve remains closed, said means to render the high speed flow control valve solenoid means inoperative being responsive to the attainment of a predetermined small angle from registry by the turret means at the time of the initiation of turret action, in which the low speed flow control valve is located on the output side of the hydraulic motor and provides braking when the high speed flow control valve is closed, and time delay means operatively associated with said relay matrix means and operative after said turret control valve closes, said turret bypass valve opens and said dump valve opens, for actuating said registry pin solenoid means for bringing said registry pin means into registry with said turret in the registry position, and thereby moving said turret means to precise registry.

21. A mechanism of claim 15, in which said low speed flow control valve is on the output side of the hydraulic motor and thereby provides braking and in which said direction control valve by closing stops driving of said hydraulic motor.

22. A mechanism of claim 15, in combination with a code control cam operatively connected to said turret means and turning with it, a code switch following said code control cam and actuated during part only of the 360° of rotation of the turret, and means operatively associated with said relay matrix and responsive to said code control switch for rendering operation of said relay matrix inoperative during said part of the 360° and permitting said code switch to operate and rendering another portion of said relay matrix inoperative during another part of said 360°.

23. A mechanism of claim 15, in combination with a relief valve operatively connected to opposite sides of said hydraulic motor and opposed check valves interposed in the hydraulic circuit on each side of said relief valve between said relief valve and said hydraulic motor, and closing at the far side in the direction of said relief valve responding to pressure surges in the system.

24. In mechanism for stopping rotating machinery, proximity actuator means turning with said rotating machinery, proximity control means including an electric circuit whose circuit characteristics change in response to said proximity actuator means while said proximity actuator means is physically remote, said electric circuit being responsive to said proximity actuator means, and stopping mechanism energized by said proximity control means when said proximity actuator means reaches a predetermined angular position.

25. A mechanism of claim 24, in combination with means for energizing said proximity control means when said rotating machinery reaches a predetermined position close to the position at which it is ultimately to be stopped.

26. In a position control device, turret means, a hydraulic motor operatively connected to said turret means, opposed fluid connecting lines connected to the opposite sides of said hydraulic motor, a direction control valve connected to said opposed fluid connecting lines and adapted in one direction to introduce hydraulic fluid to one side of the hydraulic motor and withdraw hydraulic fluid from the other side of the hydraulic motor and in the other position to reverse this relationship, a pressure relief valve connected across between said opposed fluid connecting lines, a check valve between said pressure relief valve and each of said opposed fluid connecting lines, said check valve closing toward the connection which is adjacent thereto, a bypass connected across between said fluid connecting lines, a bypass valve in said bypass adapted to open said bypass to permit free rotation of said turret means, a source of hydraulic liquid at high pressure connected to said hydraulic control valve, a dump valve in the connections from said source of hydraulic liquid to said hydraulic control valve, electrical means for operating said directional control valve, dump valve and bypass valve and a sump receiving output from said direction control valve.

27. A device of claim 26, in combination with a first high capacity flow control valve in the connections between the directional control valve and the sump, a second low capacity control valve between the directional control valve and the sump, and electrical means for closing said high capacity flow control valve.

References Cited by the Examiner

UNITED STATES PATENTS

| | | | |
|---|---|---|---|
| 725,015 | 4/03 | Fehnder | 91—452 |
| 741,828 | 10/03 | Presnell | 91—452 X |
| 1,126,900 | 2/15 | Stachel | 91—452 |
| 2,389,654 | 11/45 | Van Der Wer | 91—452 X |
| 2,878,832 | 3/59 | Hoge | 91—452 X |
| 2,902,889 | 9/59 | Treshsel | 74—823 |
| 3,002,279 | 10/61 | Miller | 74—813 X |
| 3,002,497 | 10/61 | Gulick | 91—452 X |
| 3,031,902 | 5/62 | Parske | 74—826 |
| 3,048,059 | 8/62 | Cross | 74—819 |
| 3,054,333 | 9/62 | Brainard | 90—56 |
| 3,064,499 | 11/62 | Bullard | 74—822 |
| 3,125,324 | 3/64 | Vivier | 91—452 X |

FOREIGN PATENTS 341,730  11/59  Switzerland.

BROUGHTON G. DURHAM, *Primary Examiner.*